(12) United States Patent
Saxe et al.

(10) Patent No.: US 8,539,494 B2
(45) Date of Patent: Sep. 17, 2013

(54) METHOD AND SYSTEM FOR SCHEDULING THREADS (75) Inventors: Eric C. Saxe, Livermore, CA (US); Rafael Vanoni Polanczyk, San Francisco, CA (US); Jonathan J. Chew, San Francisco, CA (US); Steven Sistare, Westford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 13/017,512

(22) Filed: Jan. 31, 2011

(65) Prior Publication Data

US 2012/0198461 A1 Aug. 2, 2012

(51) Int. Cl.
*G06F 9/46* (2006.01)
(52) U.S. Cl.
USPC .......................................... 718/103

(58) Field of Classification Search
None
See application file for complete search history.

(56) References Cited

U.S. PATENT DOCUMENTS

| | | | | |
|---|---|---|---|---|
| 6,105,053 A * | 8/2000 | Kimmel et al. | ............... | 718/105 |
| 2002/0178208 A1* | 11/2002 | Hutchison et al. | ............ | 709/102 |
| 2008/0098395 A1* | 4/2008 | Backer | .......... | 718/102 |
| 2009/0070772 A1* | 3/2009 | Shikano | ........ | 718/106 |
| 2009/0187915 A1* | 7/2009 | Chew et al. | ............ | 718/104 |

* cited by examiner

*Primary Examiner* — Emerson Puente
*Assistant Examiner* — Dong Kim
(74) *Attorney, Agent, or Firm* — Osha Liang LLP (57) ABSTRACT A method for scheduling a new thread involves identifying a criticality level of the new thread, selecting a processor group according to the criticality level of the new thread and an existing assigned utilization level of the processor group to obtain a selected processor group, increasing an assigned utilization level of the selected processor group based on the new thread, and executing the new thread by the selected processor group.

18 Claims, 8 Drawing Sheets

METHOD AND SYSTEM FOR SCHEDULING THREADS

BACKGROUND

A typical computer system includes hardware (e.g., processor(s), memory, etc.) and software (e.g., operating system, user-level applications, etc.). With regards to hardware, processor architecture has expanded from a chip with a single processor to a chip with multiple processors. Each of the multiple processors may have multiple cores. Each of the multiple cores may have multiple strands that are each configured to execute a thread.

From the software perspective, the software is often executed as one or more threads. Specifically, a thread corresponds to a sequence of instructions in execution. When a thread of an application is executed, an instruction in the thread may request the operating system of the computer system to create a new thread. In response, the operating system allocates resources and schedules the new thread to execute on the hardware.

SUMMARY

In general, in one aspect, the invention relates to a method for scheduling a new thread. The method includes identifying a criticality level of the new thread, selecting a processor group according to the criticality level of the new thread and an existing assigned utilization level of the processor group to obtain a selected processor group, increasing an assigned utilization level of the selected processor group based on the new thread, and executing the new thread by the selected processor group.

In general, in one aspect, the invention relates to a system for scheduling a new thread. The system includes hardware processing units logically grouped into processor groups and a scheduler module. The scheduler module is configured to identify a criticality level of the new thread, select a processor group according to the criticality level of the new thread and an existing assigned utilization level of the processor group to obtain a selected processor group, increase an assigned utilization level of the selected processor group based on the new thread, and schedule the new thread to execute on the selected processor group.

In general, in one aspect, the invention relates to a computer readable medium comprising computer readable program code embodied therein for causing a computer system to perform a method. The method includes identifying a criticality level of the new thread, selecting a processor group according to the criticality level of the new thread and an existing assigned utilization level of the processor group to obtain a selected processor group, increasing an assigned utilization level of the selected processor group based on the new thread, and executing the new thread by the selected processor group.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. In the figures, three co-linear dots indicate that additional items of similar type to the preceding and succeeding items with respect to the dots may optionally exist.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scheduling a new thread to execute on hardware based on the criticality level of the new thread. The criticality level of the new thread defines the urgency for executing the new thread. More specifically, the criticality level defines a degree of importance for providing the new thread with increased access to system resources. The degree of importance may be based on such factors as the number of threads that are dependent on the new thread, the type of threads that are dependent on the new thread (e.g., highly criticality threads dependent on the new thread or low criticality level threads dependent on the new thread), the type of application which the new thread is executing, and other factors.

Continuing with the discussion, hardware that may execute threads is partitioned into processor groups (discussed below). Each processor group has a corresponding assigned utilization level that defines the degree to which the hardware in the processor group is utilized. According to the criticality level of the new thread and the existing assigned utilization level of each processor group, a processor group is selected to execute the new thread. The assigned utilization level of the selected processor group is increased based on the new thread.

A new thread is any thread that is being scheduled for execution on the processor groups in one or more embodiments of the invention. For example, a new thread may correspond to a newly created thread or a thread that has already executed on the hardware and is being rescheduled to execute on the hardware.

Figure 1:
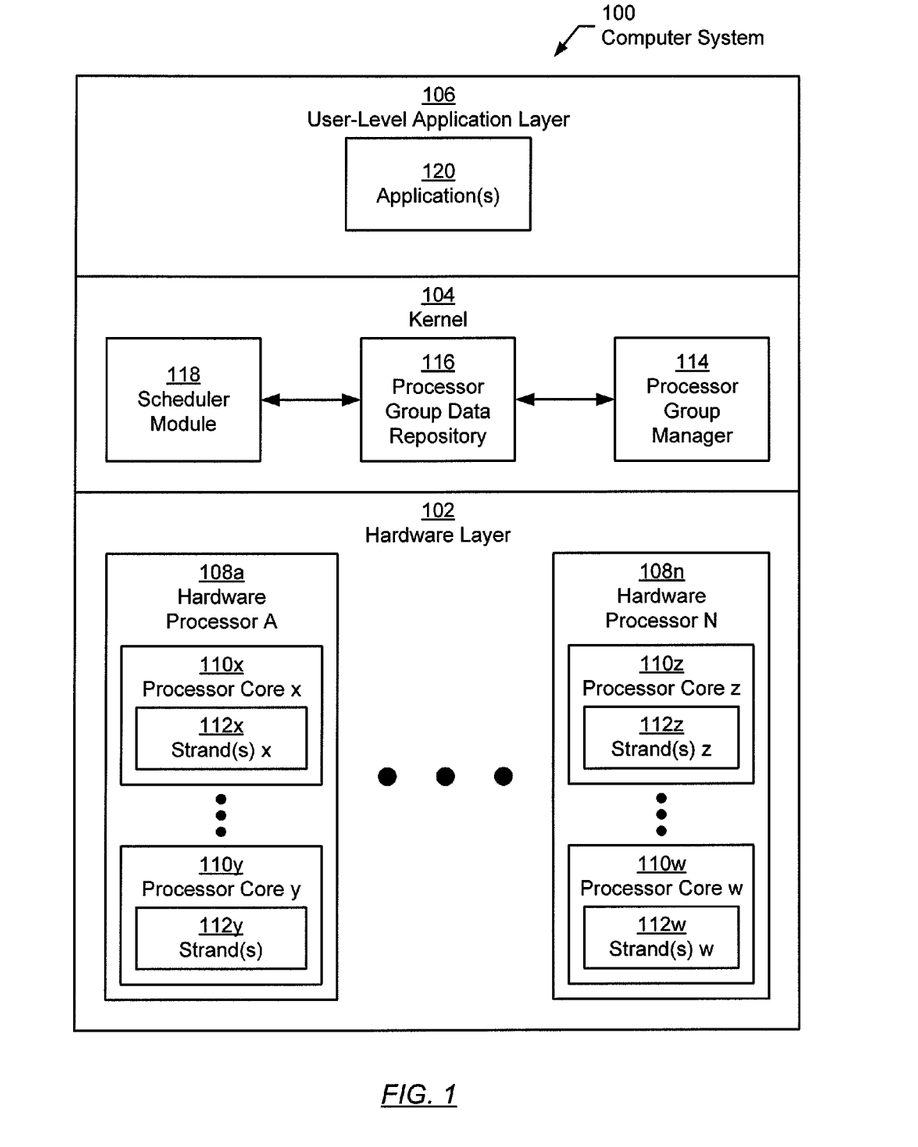
FIG. 1 shows a schematic diagram of a computer system in one or more embodiments of the invention.

FIG. 1 shows a schematic diagram of a computer system (100) in one or more embodiments of the invention. As shown in FIG. 1, the computer system (100) includes hardware layer (102), kernel (104), and user-level application layer (106). Each of these components is discussed below.

In one or more embodiments of the invention, the hardware layer (102) corresponds to the hardware architecture of the computer system. Various hardware architectures may be used without departing from the scope of the invention. For example, while FIG. 1 and the discussion below describe a hardware architecture in accordance with some embodiments of the invention, other embodiments may use different hardware architectures.

In one or more embodiments of the invention, the computer system (102) is a multi-core and/or multi-processor computer system. In other words, the hardware layer may include multiple hardware processors (e.g., hardware processor A (108a), hardware processor N (108n)). Each of the multiple hardware processors may correspond to a separate chip. Further, each processor may be connected to separate memory (not shown) or have a separate connection to shared memory (not shown) from other hardware processors in one or more embodiments of the invention. Each of the hardware processors may have a separate Level 2 (L2) cache (not shown).

In one or more embodiments of the invention, each hardware processor may include one or more processor cores (e.g., processor core x (110x), processor core y (110y), processor core z (110z), processor core w (110w)). In other words, each hardware processor may be a multi-core processor. Each processor core may include a separate Level 1 (L1) cache (not shown) from other processor cores in one or more embodiments of the invention. Each processor core has at least one execution pipeline. An execution pipeline is the hardware logic that executes the instructions.

In one or more embodiments of the invention, each processor core has one or more strands (e.g., strand x (112x), strand y (112y), strand z (112z), strand w (112w)). A strand corresponds to a hardware context for a single thread. Specifically, each strand may include required registers for the thread to execute on the execution pipeline(s) of the core (e.g., processor core x (110x), processor core y (110y), processor core z (110z), and processor core (110w)). Although a strand cannot execute instructions, as used herein, a thread is executed on the strand when the registers of the strand store information about the thread and the thread is executable on at least one of the execution pipelines.

As discussed above, different computer system hardware architectures may be used without departing from the scope of the invention. A processing unit is smallest indivisible unit for executing a thread. For example, in a single strand, single core, multiprocessor system, the processing unit is the hardware processor. In a single strand multi-core system, the processing unit is a core. In the hardware architecture shown in FIG. 1, the processing unit is the strand.

Continuing with FIG. 1, the kernel (104) is a component of the computer system's operating system (not shown). Specifically, the kernel (104) is software that manages application's (120) use of the computer system's hardware. Thus, the kernel (104) determines when and whether a user-level application (120) may access a hardware resource of the computer system (100). The separation of the hardware layer (102) and the user-level application layer (106) allows for stability and security in the computer system and for the user-level application (120) to operate without requiring knowledge of the underlying hardware configuration. For example, the kernel (104) is responsible for allocating memory in hardware for scheduling one or more new threads of the user-level application (120) for execution on the hardware processors (e.g., hardware processor A (108a), hardware processor N (108n)). In one or more embodiments of the invention, the kernel (104) includes a processor group manager (114), a processor group data repository (116), and a scheduler module (118).

In one or more embodiments of the invention, the processor group manager (114) includes functionality to generate a processor group hierarchy (not shown). In one or more embodiments of the invention, a processor group hierarchy is a collection of processor groups organized by containment. An example of a processor group hierarchy is discussed below with reference to FIG. 2.

Continuing with FIG. 1, a processor group is a logical grouping of processing units that share a resource. For example, a processor group may include only and all processing units that share the same execution pipeline, that are all on the same chip, that share the same memory, that share a connection to memory, that are all part of the same interconnect, or have another shared resource.

In one or more embodiments of the invention, each processor group has corresponding attributes of the processor group. In one or more embodiments of the invention, attributes of the processor group may include one or more of the following: processing unit identifiers, child processor group identifiers, assigned utilization level, and capacity level. A processing unit identifier is an identifier of a processing unit. For example, the processing unit identifier may be a location of the processing unit, a hardware identifier, or another identifier that uniquely identifies the processing unit. The child processing group identifier identifies the processor groups that are contained by the processor group.

Continuing with the discussion of the attributes, the capacity level identifies the total amount of resources allocated to the processor group. The unit of measurement used to define the capacity level may be the number of processing units, the number of instructions processed per unit of time, power consumption, any other unit of measurement that can define processor group resources, or a combination of units of measurement.

The assigned utilization level defines the amount of resources that are used by threads assigned to the processor group. In one or more embodiments of the invention, the assigned utilization level may be defined as a total number of resources, a percentage of capacity level, or another parameter.

In one or more embodiments of the invention, the assigned utilization level for the processor group is a total of the assigned utilization level for each of the threads assigned to the processor group. In general, the assigned utilization level for a thread represents the amount of resources that the thread is expected to use. In one or more embodiments of the invention, the assigned utilization level for a thread is dependent on the criticality level of the thread. Specifically, the assigned utilization level for a highly critical thread may be an inflated utilization level while the assigned utilization level for a less critical thread may be deflated. By inflating the utilization level for a highly critical thread, additional threads are less likely to be assigned to the same processor group as the highly critical thread. In such a scenario, the highly critical thread has more access to resources as there are fewer threads to share the resources. Conversely, by deflating the utilization level for a less critical thread, additional threads are more likely to be assigned to the same processor group as the less critical thread. In such a scenario, although the less critical thread has less access to resources, other processor groups are able to process more critical threads.

As discussed above, the assigned utilization level may be an actual utilization level, an inflated utilization level, a deflated utilization level, or a combination thereof. For example, an actual utilization level is the amount of resources that are used at a current time. An inflated utilization level is a utilization level that is assigned to the processor group and is greater than the amount of resources that are used at a current time. A deflated utilization level is a utilization level that is assigned to the processor group and is less than the amount of resources that are used at a current time. Inflating and deflating utilization levels is discussed below with reference to FIG. 3.

By way of an example, if three threads are assigned to a processor group, then the assigned utilization level of the processor group is the total of the assigned utilization level of each of the three threads in one or more embodiments of the invention. As another example, in one or more embodiments of the invention, one thread may be allocated an inflated utilization level while another thread may be allocated a deflated utilization level. In the example, the assigned utilization level of the processor group is the total of the inflated utilization level and the deflated utilization level.

In one or more embodiments of the invention, the assigned utilization level may exceed capacity level for the processor group. For example, the assigned utilization level may exceed capacity level when assigned utilization level is inflated or when the resources of the computer system are over utilized.

Assigned utilization level and/or capacity level may be stored as an availability level in one or more embodiments of the invention. An availability level specifies the amount of resources that are available on the processor group. Thus, the availability level is equal to the assigned utilization level subtracted from the capacity level. Specifically, the availability level may be decremented when additional threads are assigned to the processor group and incremented when threads stop executing on the processor group in one or more embodiments of the invention. Because the availability level is a function of the assigned utilization level, the availability level may represent an actual availability level, an inflated availability level, or a deflated availability level in one or more embodiments of the invention.

Rather than the assigned utilization level and the capacity level being stored as an availability level, the assigned utilization level and capacity level may be stored separately. The availability level may be stored in addition to the assigned utilization level and capacity level and/or may be calculated from the assigned utilization level and capacity level.

Continuing with FIG. 1, a processor group data repository (116) is any type of storage unit (e.g., a file, database, collection of tables, data structure in memory, any other storage mechanism, or combination thereof) for storing the processor group hierarchy. Specifically, the processor group data repository (116) stores attributes of the processor groups in one or more embodiments of the invention. The processor group data repository may also include additional information, such as information about executing threads and other information for the management of the computer system (100).

In one or more embodiments of the invention, the scheduler module (118) is operatively connected to the processor group data repository (116). The scheduler module is a component of the kernel (104) that includes functionality to receive a request for a new thread and select the processor group to execute the new thread. Specifically, the scheduler module (118) includes functionality to schedule the new thread to execute on a processor group based on the utilization of the processor group. The scheduler module (118) may further include functionality to identify the criticality level of the new thread and account for the criticality level of the new thread to select the processor group for the new thread (discussed below). The scheduler module may further include functionality to increase the assigned utilization level of processor groups based on the execution of the new thread.

Although FIG. 1 shows the processor group manager (114), the processor group data repository (116), and the scheduler module (118) as being separate components, two or more of the aforementioned components may be combined into a single component. For example, the functionality of the scheduler module (118) and the processor group manager (114) may be combined into a single component.

As discussed above, the kernel (104) communicates with a user-level application layer (106). The user-level application layer (106) is an execution environment for user-level applications. In one or more embodiments of the invention, the user-level application layer (106) may include an application (120).

An application (120) is any type of user-level software that executes on the computer system (100). Specifically, the application (120) uses the kernel (104) to access the resources of the computer system (100). In one or more embodiments of the invention, an application is executed when the threads of the application execute. In one or more embodiments of the invention, a thread is a series of instructions in execution. The application (120) may be a single threaded or multi-threaded application. In one or more embodiments of the invention, the application (120) may include an instruction, such as a system call, to request the operating system to create a new thread (not shown).

The instruction may include a priority value for the new thread in one or more embodiments of the invention. In one or more embodiments of the invention, the priority value is an assigned value defining a relative importance as compared to other threads for executing the new thread. Specifically, the priority value defines the importance of having the particular thread execute uninterrupted or as quickly as possible. In one or more embodiments of the invention, the priority value assigned to a thread may be specified and/or modified at any given time by the user or by the operating system. For example, the priority value may be specified in the instruction to create the new thread, after the thread is created, or during runtime. In one or more embodiments of the invention, the criticality level of the thread may be recalculated when the priority value is modified.

The priority value may be defined according to a scale. For example, consider the scenario in which the scale is from 1 to 10, where a thread that is assigned a 10 has a high priority and a thread that is assigned a 1 has a low priority. In such a scenario, a new thread that is assigned a priority value of 7 has higher priority than a thread that is assigned a priority value of 5. Alternatively or additionally, the priority value may be defined according to a rating. In such embodiments, the priority value may be defined, for example, from the set having "high" priority, "medium" priority, "low" priority in one or more embodiments of the invention.

In one or more embodiments of the invention, the new thread is assigned a criticality level. The criticality level is a value used by the scheduler module (118) for scheduling the new thread. In one or more embodiments of the invention, the criticality level is the priority value. Alternatively or additionally, the criticality level may be calculated from the priority value and/or may include additional factors not used to specify the priority value.

Specifically, the criticality level may be based on whether the priority value is greater than or less than one or more predefined threshold values in one or more embodiments of the invention. For example, consider the scenario in which the priority value is defined according to a scale of 1 to 20. The predefined threshold values may be 7 and 14 in the example. Continuing with the example, when a thread is assigned a priority value greater than 14, the thread has a high criticality level. When a thread is assigned a priority value greater than 7 and less than 14, the thread has a medium criticality level in the example. When a thread is assigned a priority value less than 7, the thread has a low criticality level in the example. The aforementioned is only an example and other scales and threshold values may be used without departing from the scope of the invention.

Alternatively or additionally, the criticality level may be defined according to the number of dependent threads of the new thread. A dependent thread is a thread that must wait for the new thread to execute before the dependent thread can execute. For example, the dependent thread may have memory accesses to the memory location to which the new thread writes a value. In such a scenario, the dependent thread may be required to wait until after the new thread executes in order to execute the memory access instruction.

In one or more embodiments of the invention, the greater number of threads that are dependent on the new thread, the higher the criticality level of the new thread. For example, a new thread that has five dependent threads may have a greater criticality level than a new thread having only one dependent thread. If the criticality level is based on the number of dependent threads, the criticality level may be defined according to whether the new thread has more than a threshold number of dependent threads. For example, threads having more than 10 dependent threads may be assigned a high criticality level. In the example, threads having more than 3 dependent threads and less than 10 dependent threads may be assigned a medium criticality level. Threads having less than 3 dependent threads may have a low criticality level.

In addition or as an alternative to the number of dependent threads, the criticality level of the dependent threads may be accounted for when specifying the criticality level of the new thread. For example, if all dependent threads have a low criticality level, then the criticality level of the new thread may be set to low unless the number of dependent threads is greater than a threshold. If a single dependent thread has a high criticality level, then the criticality level of the new thread may be set to high in order for the single dependent thread to execute in one or more embodiments of the invention.

Alternatively or additionally, the criticality level may be based on a combination of factors. For example, the criticality level may be based on the number of dependent threads, the priority level, the type of application, and/or any other attributes of the new thread or combination thereof. The above are only a few factors of the criticality level. Other factors may be used without departing from the scope of the invention.

In one or more embodiments of the invention, in addition to the above components, the computer system (100) may include a compiler. The compiler may include functionality to calculate a number of dependent threads of a new thread. The compiler may further be configured to add an identifier of the number of dependent threads to the request for creating the new thread. The compiler may further be configured to make a system call, which passes the number of dependent threads when such number changes after a new thread has been created.

As an alternative to a physical device, the computer system (100) may be a virtual system executing in a partition of a physical computing device. In the scenario in which the computer system (100) is a virtual computer system, the hardware layer (102) corresponds to hardware resources (e.g., portions of memory, time on the processor) allocated to the partition.

For example, the partition may be a software partition. For example, a physical computer system may include a host operating system (not shown) configured to execute one or more system virtual machines. Broadly speaking, the system virtual machines are distinct operating environments configured to inherit underlying functionality of the host operating system via an abstraction layer. In one or more embodiments of the invention, each system virtual machine includes a separate instance of an operating system. For example, the Xen® virtualization project allows for multiple guest operating systems executing in a host operating system. Xen® is a trademark overseen by the Xen Project Advisory Board.

Figure 2:
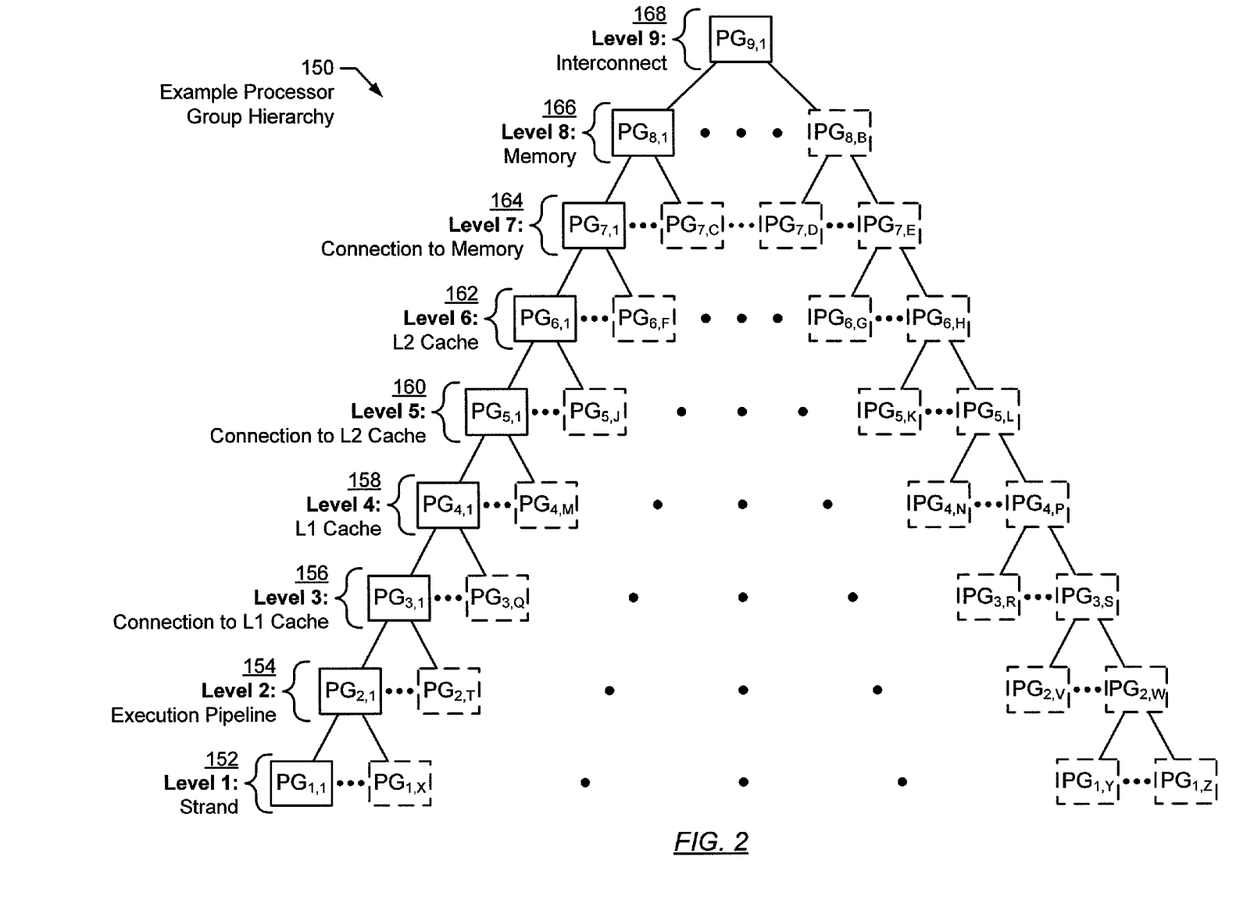
FIG. 2 shows an example processor group hierarchy in one or more embodiments of the invention.

FIG. 2 shows an example of a processor group hierarchy (150) in one or more embodiments of the invention. In FIG. 2, dotted lines are used to represent additional optional processor groups. Specifically, FIG. 2 is a logical representation of the processor group hierarchy (150). Various data structures may be used to store the processor group hierarchy (150) without departing from the scope of the invention. In FIG. 2, processor groups are denoted as "PG".

As shown in FIG. 2, the processor group hierarchy (150) may be organized as a graphical tree. In the graphical tree, each processor group may have one or more children processor groups. The children processor groups are the processor groups that are contained in the processor group and are directly connected to the processor group in the processor group hierarchy in one or more embodiments of the invention. For example, $PG_{9,1}$ contains child processor group $PG_{8,1}$ and child processor group $PG_{8,B}$. Processor groups may also have direct and indirect parent processor groups. For example, $PG_{9,1}$ is the direct parent processor group of $PG_{8,1}$ and an indirect parent processor group of processor $PG_{7,1}$ and $PG_{6,1}$. Each level of the graphical tree represents a type of hardware resource. Processing units in a single processor group all share the same hardware resource corresponding to the level. Processing units outside of the single processor group do not have access to the hardware resource corresponding to the level and allocated to the single processor group.

For example, level 1 (152) may correspond to a strand level. Processing unit(s) in a single processor group in level 1 (152) all share the same strand. If the processing unit is a strand, then each processor group in level 1 (152) has a single strand.

As another example, level 2 (154) may correspond to an execution pipeline level. Processing unit(s) in a single processor group in level 2 (154) all share the same execution pipeline(s). For example, in FIG. 2, $PG_{1,1}$ and $PG_{1,X}$ both use the same execution pipeline(s). In other words, instructions from $PG_{1,1}$ and $PG_{1,X}$ may execute on any of the execution pipelines allocated to $PG_{2,1}$. Processor units that are not contained in processor group $PG_{2,1}$ do not have access to the execution pipeline in one or more embodiments of the invention.

As another example, level 3 (156) may correspond to a connection to L1 cache level. Processing unit(s) in a single processor group in level 3 (156) all share the same connection to the L1 cache. For example, in FIG. 2, $PG_{2,1}$ and $PG_{2,T}$ both use the same connection to the L1 cache. Processor units that are not contained in processor group $PG_{3,1}$ do not have access to the L1 cache in one or more embodiments of the invention. For example, processor group $PG_{2,Y}$ has a separate connection to an L1 Cache.

Similarly, level 4 (158) may correspond to the L1 cache level. Only and all processing unit(s) in a single processor group in level 4 (158) share the same the L1 cache. Level 5 (160) may correspond to the connection to L2 cache level. Only and all processing unit(s) in a single processor group in level 5 (160) share the same connection to the L2 cache. Level 6 (162) may correspond to the L2 cache level. Only and all processing unit(s) in a single processor group in level 6 (162) share the same the L2 cache. Level 7 (164) may correspond to the connection to memory level. Only and all processing unit(s) in a single processor group in level 7 (164) share the same connection to memory. Level 8 (166) may correspond to the memory. Only and all processing unit(s) in a single processor group in level 8 (166) share the same memory. Level 9 (168) may correspond to the interconnect. Only and all processing unit(s) that are part of the interconnect are in processor group $PG_{9,1}$ in level 9 (168).

In one or more embodiments of the invention, the top level of the processor group hierarchy (e.g., Level 9 (168) in FIG. 2) is the root level. The top processor group is a root processor group in one or more embodiments of the invention. In one or more embodiments of the invention, the root processor group contains the remaining processor groups in the processor group hierarchy. In one or more embodiments of the invention, the root processor group contains all processing units in the computer system.

The above examples of the hardware resource corresponding to each processor group are only examples in one or more embodiments of the invention. Specifically, one or more levels of the processor group hierarchy may correspond to different hardware resources than those discussed above, may be added, or may be omitted. More specifically, the processor group hierarchy is dependent on the architecture of the computer system and may correspond to a different computer system architecture than the computer architecture discussed above in one or more embodiments of the invention.

Figure 3:
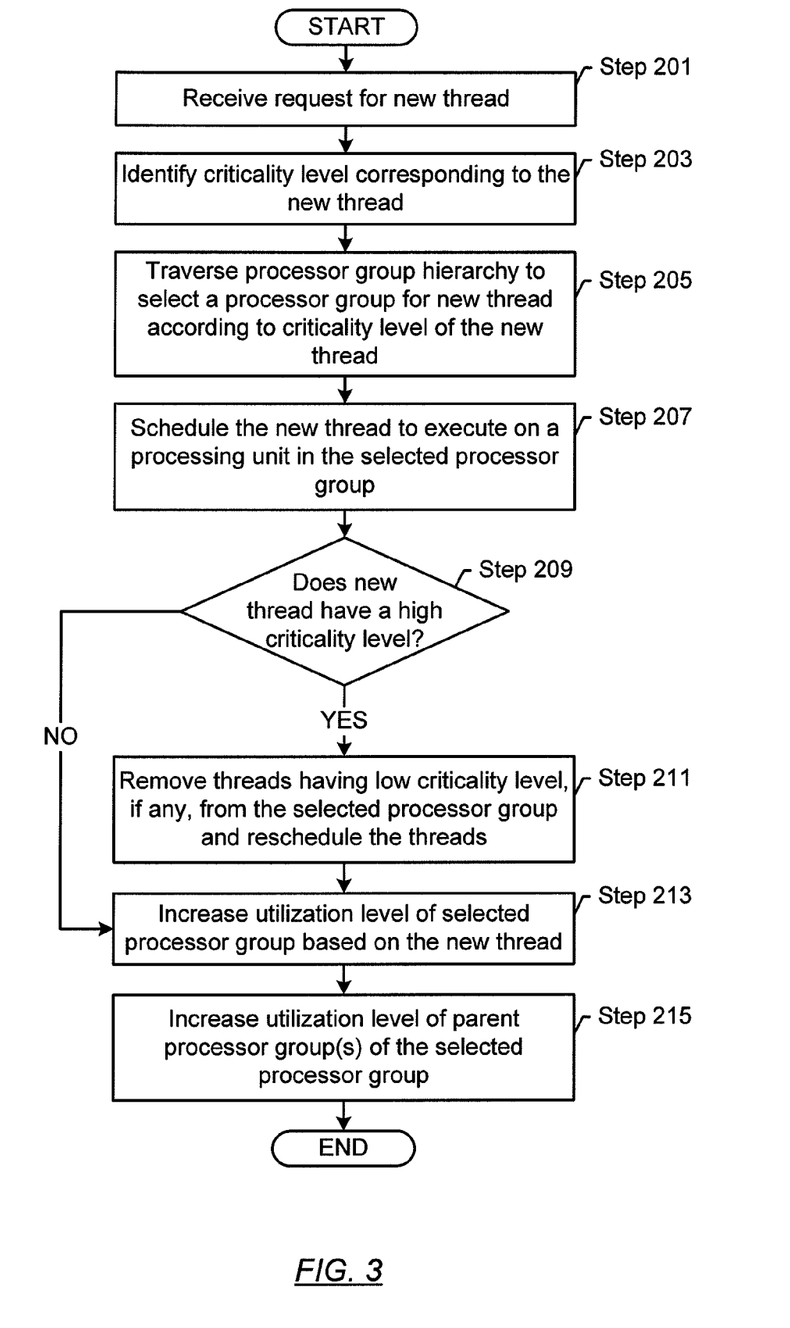
FIGS. 3-4 show flowcharts in one or more embodiments of the invention.
Figure 4:
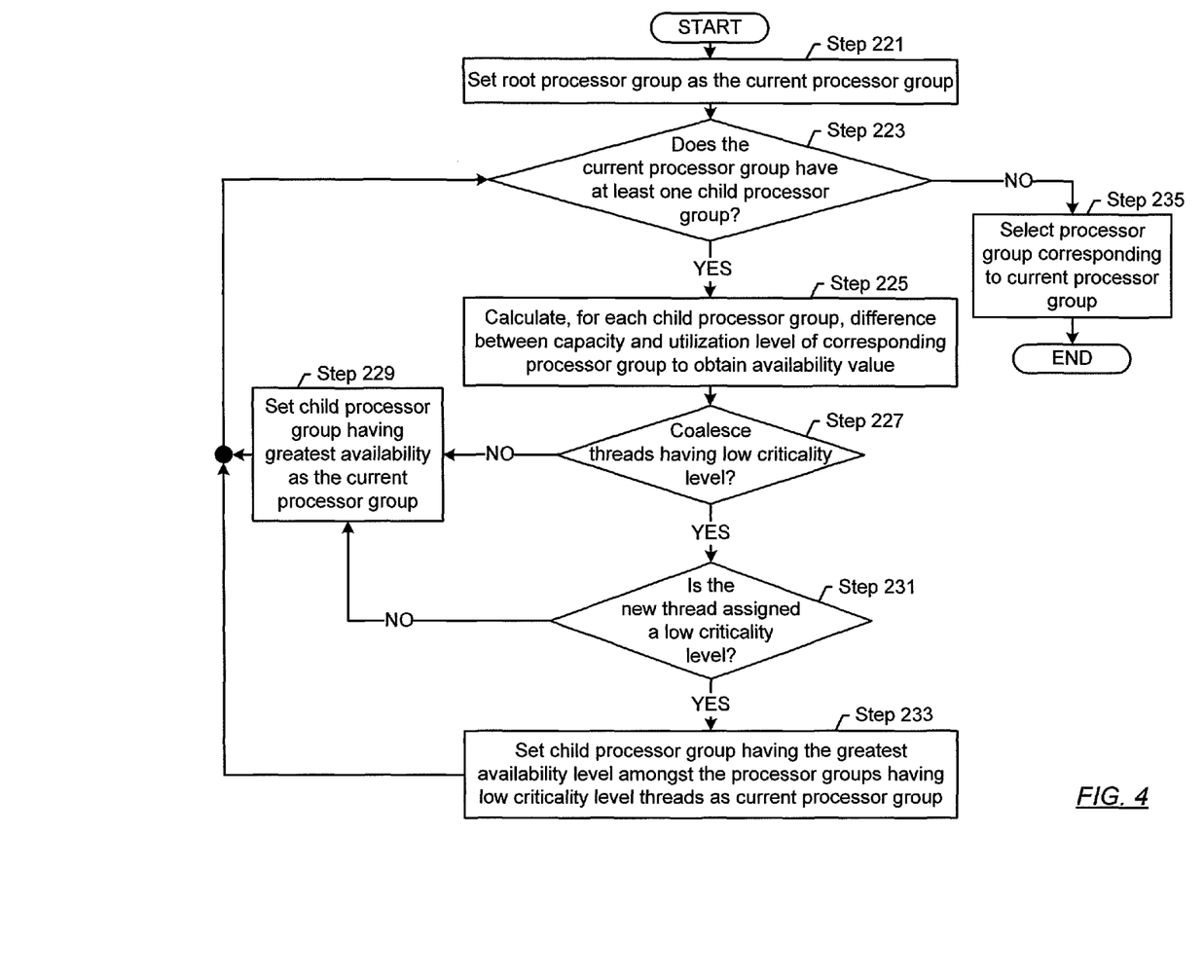

FIGS. 3 and 4 show flowcharts for scheduling a new thread in one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 201, a request for a new thread is received. In one or more embodiments of the invention, the request may be received as a system call. The request may include parameters, such as the maximum priority that can be assigned to the new thread, a minimum priority that can be assigned to the new thread, and a default priority that can be assigned to the new thread. In one or more embodiments of the invention, the priority may be assigned to the thread in accordance with a pre-defined policy for thread-priority assignment and management. Specifically, the pre-defined policy may define the initial priority assignment for the thread, as well as how the assigned priority is to be managed or adjusted over time. Additionally, the request for the new thread may include additional parameters without departing from the scope of the invention.

In Step 203, the criticality level corresponding to the new thread is identified in one or more embodiments of the invention. As discussed above, different factors may be used in varying embodiments to define the criticality level. Below is a discussion of a few processes to identify the criticality level in one or more embodiments of the invention.

In a first process, in one or more embodiments of the invention, the criticality level may be defined based only on the priority value. The priority value may be defined in the request for the new thread or may be provided separately from the request. In one or more embodiments of the invention, the priority value is set by the developer when the developer is creating the application. Alternatively, the priority value may be defined by the compiler that compiles the application. Further, as discussed above, multiple priority values may be defined with the request. In such a scenario, the scheduler may be preconfigured to define the criticality level as a function of the multiple priority values or use the default priority value. The pre-configuration of the scheduler may be performed in a configuration variable and/or part of the program code of the scheduler.

When the scheduler receives the priority value, the scheduler may use the priority value directly or indirectly. As an example of using the priority value directly, the scheduler may identify the priority value as the criticality level. As an example of using the priority value indirectly, the scheduler may have one or more threshold values for the priority value. In the example, the criticality level may be defined as a function of the relation between the priority value and the threshold values. By way of a concrete example, consider the scenario where the threshold values are 5, 10, 15, and 20. In such a scenario, when priority value is less than 5, then the criticality level of the new thread is set as low; when priority value is greater than 5 and less than 10, then the criticality level of the new thread is set as medium low; when priority value is greater than 10 and less than 15, then the criticality level of the new thread is set as medium; when priority value is greater than 15 and less than 20, then the criticality level of the new thread is set as medium high; and when priority value is greater than 20, then the criticality level of the new thread is set as high. As shown in the example, the criticality level is indirectly defined by the priority value.

Continuing with processes to identify the criticality level, a second process to identify the criticality level may be based on the number of dependent threads. Analyzing the number of dependent threads may be performed by the scheduler module or a compiler of the application. For example, the compiler of the application may include functionality to calculate for each new thread of the application, the memory location accessed by the new thread. When multiple threads access the same memory location, the compiler includes functionality to identify the order at which the threads must access the memory location. The first thread that must access the memory location has a high criticality level because the later threads to access the memory location are dependent on the first thread.

Another method for identifying the number of dependent threads may be performed as follows. Threads may exchange information via synchronization primitives defined by the operating system, such as pipes, semaphores, message queues, etc. When a thread T posts to such a primitive, the operating system may note the thread(s) that becomes runnable because of the post and add the runnable thread(s) to a set of dependent threads associated with T.

For example, consider the scenario in which a thread (A) requests a resource that has been allocated to thread (B). Thread (A) might attempt to acquire a synchronization primitive protecting that resource that is held by thread (B) and block. The operating system may note that thread (A) is blocking on a resource held by thread (B), and that thread (A) is therefore dependent on thread (B). The information may be stored in a data structure associated with thread (B), the resource, or both. Specifically, the data structure may contain the number of dependent threads, the identity of dependent threads, contention for (or characteristics of) the resource, or any other information useful in deriving thread criticality. The information may subsequently be used to calculate the criticality of thread (B).

Continuing with the discussion of FIG. 3, in the second process, the criticality level may be defined using only the number of dependent threads, based on the number of dependent threads and the priority value, and/or based on other factors. As an example of defining the criticality level on the number of dependent threads, the criticality level may be based on whether the new thread has more or less than one or more threshold number of dependent threads. Such calculation may be performed similar to the priority value as discussed above. Further, the number of dependent threads and the priority value may be combined using a mathematical function to determine the criticality level.

Other factors for defining the criticality level may include the type of application. For example, if the application is a background application, then the criticality level may be set less than applications that interact with users. Other factors may be used without departing from the scope of the invention.

A third process to identify the criticality level may be for the compiler of the application to define the criticality level. For example, the compiler of the application may determine the number of dependent threads of the new thread. The compiler may then insert an instruction or parameter in the application that specifies the criticality level based on the number of dependent threads or the compiler may insert an instruction or parameter that specifies the criticality level directly.

In one or more embodiments of the invention, rather than the criticality level being automatically specified by the computer system, the criticality level may be specified by a user or developer. For example, the user may submit the criticality level of the thread or a group of threads (e.g., corresponding to an application) using an operating system interface.

The above are only a few of the processes to define the criticality level. Other processes may be used without departing from the invention.

Continuing with FIG. 3, in Step 205, the processor group hierarchy is traversed to select a processor group for the new thread according to the criticality level in one or more embodiments of the invention. The criticality level of the new thread may be used in a variety of manners to select the processor group. For example, the criticality level may be used to inflate the utilization attributed to the new thread. For example, if the new thread is a highly critical thread, then the assigned utilization level of the new thread may be increased, such as from the new thread's average utilization level to the new thread's maximum utilization level, by a multiple of the new thread's utilization, a capacity level of a processor group, or another factor of utilization level.

By way of a more concrete example, consider the scenario in which the new thread has a minimum utilization level of 5, an average utilization level of 6, and a maximum utilization level of 7. In other words, at particular execution time, the new thread requires 5 resources to execute, where 5 is the minimal amount of resources required by the new thread over all execution times. However, during execution, the new thread requires 7 resources at a second particular execution time, where 7 is the maximum amount of resources required by the new thread over all execution times. On average over all execution times, the new thread requires 6 resources. In the example, the assigned utilization level for the new thread may be inflated to 7 for all execution times, deflated to 5 for all execution times, set to 6 for all execution times, or set the current execution time's amount of resources used.

Continuing with the example, the criticality level of the thread may be used to assign the thread a utilization level. Specifically, the criticality level of the new thread may be used to select whether to inflate to 7 for all execution times, deflate to 5 for all execution times, set to 6 for all execution times, or set the current execution time's amount of resources used. The aforementioned is only an example and other methods for inflating and deflating the assigned utilization level attributed to the new thread may be used without departing from the invention.

The inflated utilization level may be used to ensure that the selected processor group or direct and indirect parent processor groups of the selected processor group have sufficient capacity for the inflated utilization level.

Alternatively or additionally, the criticality level of the new thread may be used to select which portion of the processor group hierarchy to traverse. For example, threads assigned a low criticality level may be coalesced into a sub-portion of the processor group hierarchy. By coalescing threads assigned a low criticality level, new threads, that are assigned a high criticality level and later added, can be assigned to processor groups that have a greater number of resources available. In one or more embodiments of the invention, traversing the processor group hierarchy is discussed below and in FIG. 4.

Continuing with FIG. 3, in Step 207, the new thread is scheduled to execute on a processing unit in the selected processor group in one or more embodiments of the invention. Specifically, the scheduler assigns the new thread to the selected processor group.

In Step 209, a determination is made whether the new thread has a high criticality level in one or more embodiments of the invention. If the new thread has a high criticality level, then the flow proceeds to Step 211 in one or more embodiments of the invention. In Step 211, threads having a low criticality level, if any exist, are removed from the selected processor group. Removing the existing threads that are assigned a low criticality may be performed to free resources of the processor group. In one or more embodiments of the invention, threads with low criticality level are removed when the selected processor group, or direct or indirect parent processor groups of the selected processor group, does not have sufficient capacity for the higher utilization of the new thread with the high criticality level. Although not shown in FIG. 3, besides low criticality level threads, other threads may also be removed from the processor group. In one or more embodiments of the invention, the removal of a thread may be performed immediately when a high criticality level thread is executed, or later, such as next time the thread is scheduled to execute, in which case the thread is scheduled to execute on a different processor group.

As part of removing the threads assigned a low criticality level, the removed threads assigned the low criticality level are rescheduled in one or more embodiments of the invention. Rescheduling the removed threads may be performed as discussed above by treating each of the removed threads as a new thread.

Regardless of whether the new thread has a high criticality level, the assigned utilization level of the selected processor group is increased based on the new thread in Step 213. In one or more embodiments of the invention, the increase of the utilization level assigned to the processor group may account for the inflated utilization level of the new thread. In one or more embodiments of the invention, the assigned utilization level of the thread is added to the current assigned utilization level of the selected processor group. Alternatively or additionally, the assigned utilization level for the selected processor group may be inflated to the capacity of the processor group when the new thread has a high criticality level.

In Step 215, the assigned utilization level of parent processor groups of the selected processor group is increased to account for the new thread in one or more embodiments of the invention. Similar to increasing the assigned utilization level for the selected processor group, the assigned utilization level of the direct and indirect parent processor groups of the selected processor group may also be increased in one or more embodiments of the invention.

Although the above is discussed with regards to increasing assigned utilization level, one method to increase assigned utilization level is to decrease availability level when the availability level is stored rather than the assigned utilization level. In such a scenario, Steps 213 and 215 may be performed by decreasing the availability level without departing from the invention.

FIG. 4 shows a flowchart for traversing the processor group hierarchy in one or more embodiments of the invention. In Step 221, the root processor group is selected as the current processor group in one or more embodiments of the invention. In Step 223, a determination is made about whether the current processor group has at least one child processor group in one or more embodiments of the invention. If the current processor group has at least one child processor group, then the current processor group does not correspond to a processing unit in one or more embodiments of the invention. Accordingly, determining which child processor group traversed to next is performed.

If the current processor group has at least one child processor group, then an availability level is calculated in Step 225 in one or more embodiments of the invention. In one or more embodiments of the invention, the availability level may be calculated by subtracting the current assigned utilization level assigned to the child processor group from the capacity level of the processor group. Rather than calculating the availability level, the availability value may be pre-stored. For example, the availability value may be calculated and then stored. Alternatively, as discussed above, the availability value may be stored instead of the capacity level and the assigned utilization level. Although FIG. 4 shows using the availability level, if all child processor groups have the same capacity, then the assigned utilization level of the child processor groups may be used.

In Step 227, a determination is made about whether to coalesce threads having low criticality level in one or more embodiments of the invention. In one or more embodiments of the invention, whether to coalesce threads is based on a pre-configuration of the scheduler. For example, an administrator of the computer system may specify the portion of the processor group hierarchy to use for low criticality level threads. Alternatively, the code of the scheduler may specify which portion of the processor group hierarchy to use for low criticality level threads.

If Step 229, if the determination is made not to coalesce threads, then the child processor group having the greatest availability is set as the current processor group in one or more embodiments of the invention. Specifically, the scheduler may select the child processor group with the highest availability level to traverse to next. The scheduler than sets the selected child processor group as the current processor group.

In Step 231, if the determination is made to coalesce threads, then a determination is made whether the new thread is assigned a low criticality level. If the new thread is assigned a low criticality level, then the processor group having the greatest availability level amongst the processor groups having low criticality level threads is selected as the current processor group in Step 233. The selection may be based, for example, on one or more attributes of the child processor group. For example, an attribute of the child processor group may be that the child processor group is set as a low criticality level child processor group. If the new thread is not assigned a low criticality level, then the processor group having the greatest availability is set as the current processor group as shown in Step 229.

At this stage, the next current processor group is set and the steps repeat for the next current processor group. In Step 223, a determination is made whether the current processor group has at least one child processor group in one or more embodiments of the invention. If a determination is made that the current processor group does not have at least one child processor group, then in Step 235, the processor group corresponding to the current processor group is selected in one or more embodiments of the invention. At the end of Step 235, in one or more embodiments of the invention, a processor group is selected for executing the new thread.

Figure 5A:
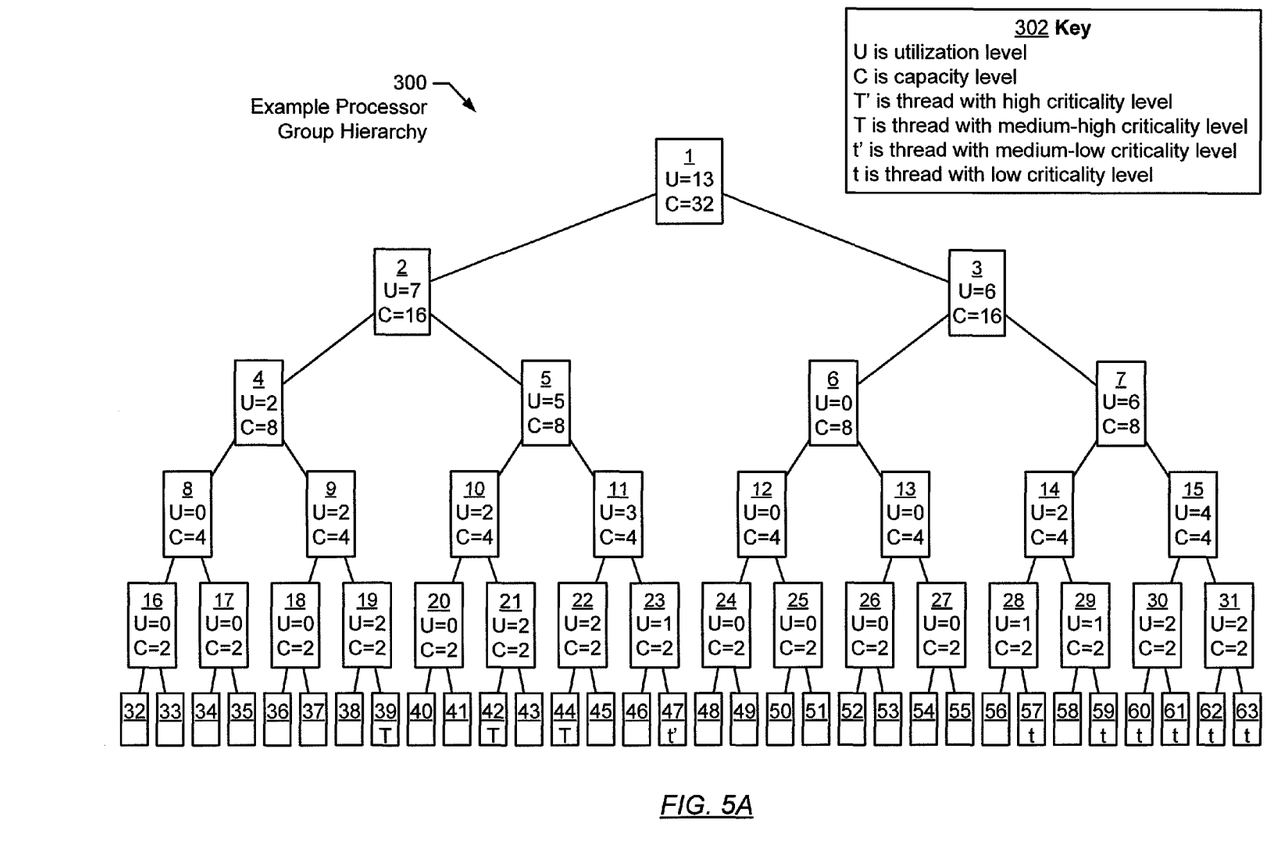
FIGS. 5A-5C shows an example in one or more embodiments of the invention.
Figure 5B:
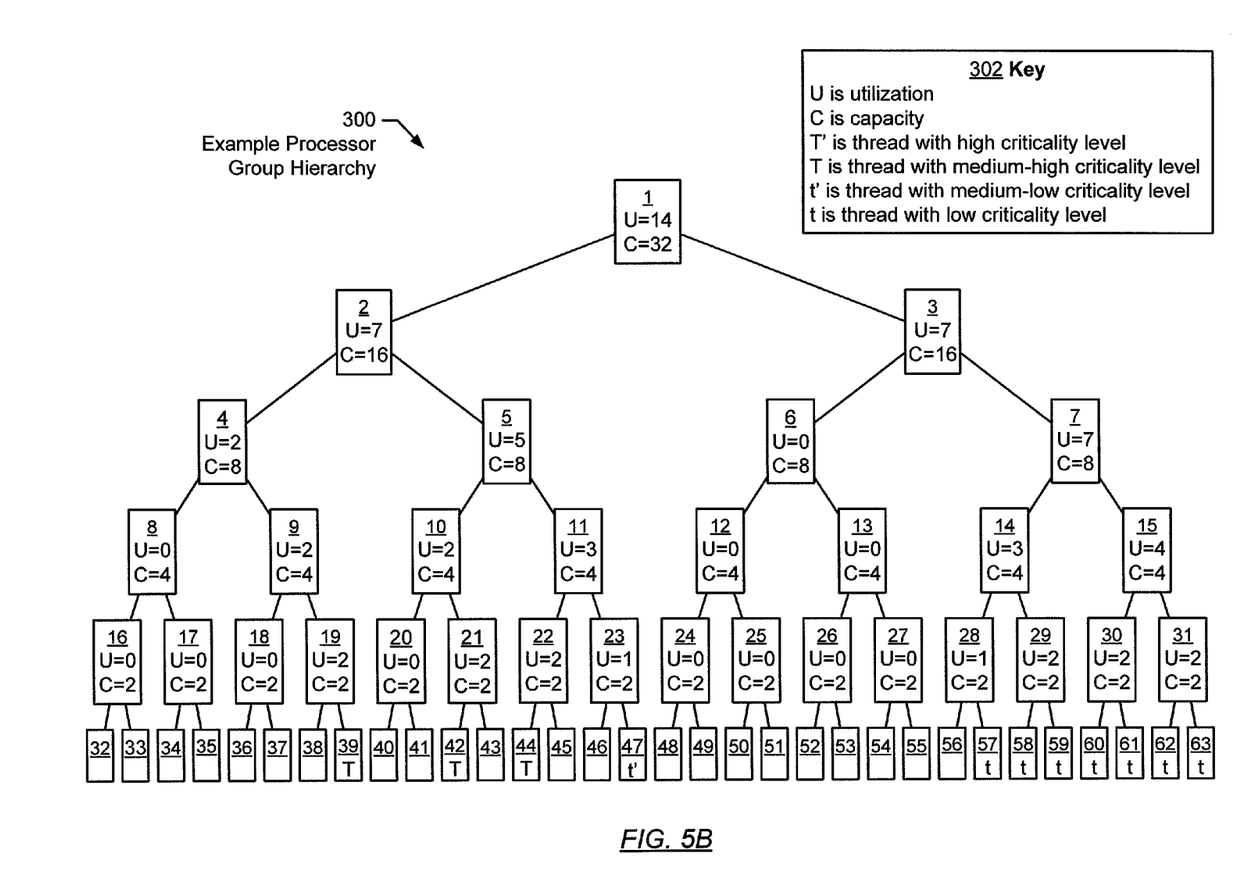
Figure 5C:
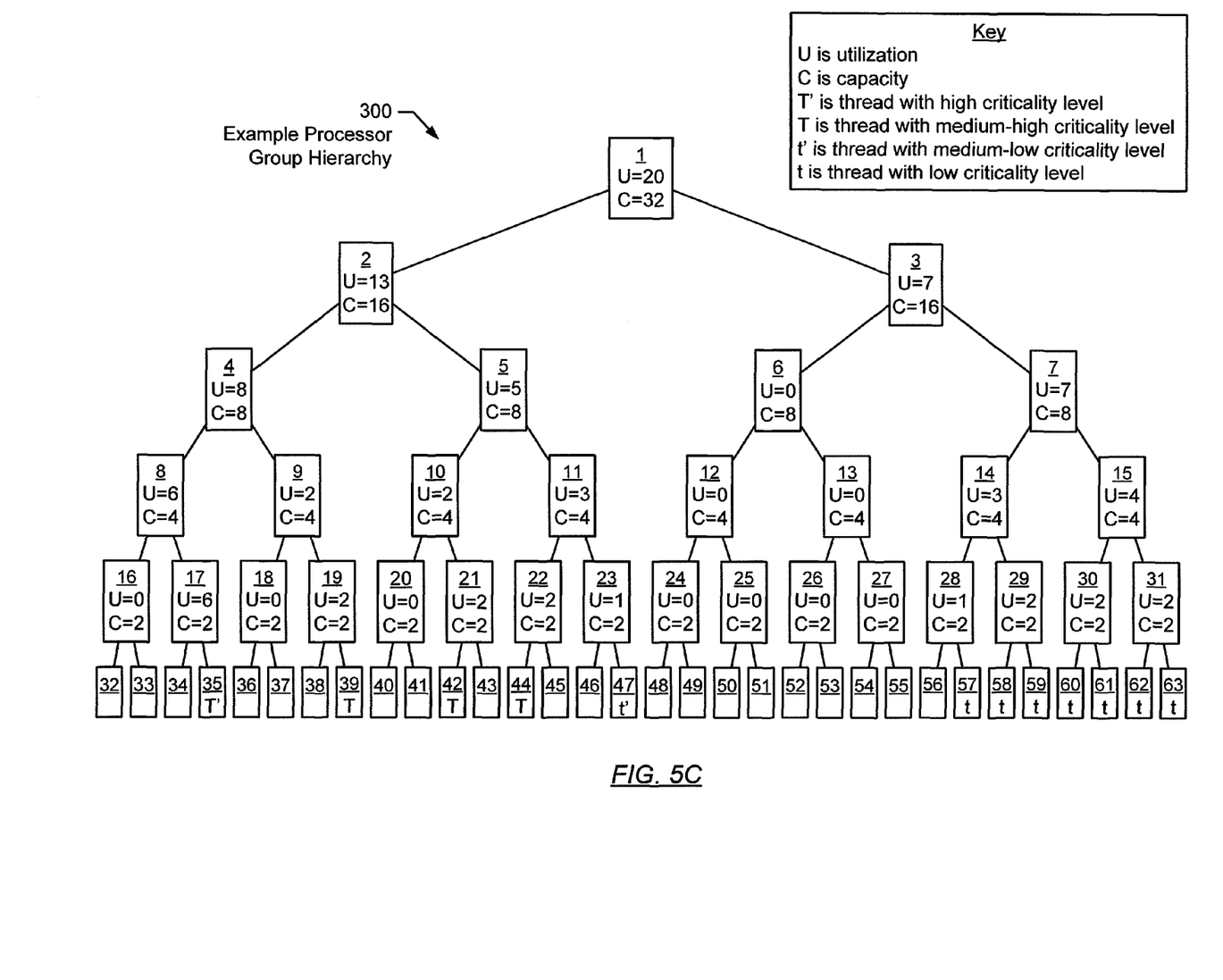

The following example is for explanatory purposes only and not intended to limit the scope of the invention. FIGS. 5A-5C show an example in one or more embodiments of the invention. FIG. 5A shows an example processor group hierarchy (300) in one or more embodiments of the invention. As shown in FIG. 5A, the example processor group hierarchy includes six levels. Level 1 includes processor groups (32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, and 63) and corresponds to individual strands. In the example, the individual strands are the processing units. Level 2 includes processor groups (16, 17, 18, 19, 20, 21, 22, 23, 24, 25, 26, 27, 28, 29, 30, and 31) and corresponds to execution pipelines. Specifically, strands that share the same execution pipeline are in the same processor group.

Level 3 includes processor groups (8, 9, 10, 11, 12, 13, 14, 15) and corresponds to L1 cache. Level 4 includes processor groups (4, 5, 6, and 7) and corresponds to L2 cache. Level 5 includes processor groups (2 and 3) and corresponds to memory. Level 6 corresponds to processor group (1) and corresponds to the interconnect.

In the example, processor group hierarchy (300), as shown by way of key (302), "U" represents assigned utilization level, "C" represents capacity level, "T'" is a thread assigned a high criticality level, "T" represents a thread assigned a medium-high criticality level, "t'" represents a thread assigned a medium-low criticality level, "t" represents a thread that is assigned a low criticality level.

For the purpose of the example, consider the scenario in which the assigned utilization level and capacity level are measured in terms of number of threads. Thus, each strand has a capacity level of one, each level 2 processor group has a capacity level of 2, each level 3 processor group has a capacity level of 4, each level 4 processor group has a capacity level of 8, each level 5 processor group has a capacity level of 16, and the interconnect has a capacity level of 32.

For the example, the actual utilization level of each thread is 2. However, the actual utilization level may be inflated or deflated based on the criticality level of each thread. Specifically, in the example, the actual utilization level for a low criticality thread ("t") and a medium low criticality thread ("t'") is deflated for each to have an assigned utilization level of 1; the actual utilization level for a medium high criticality thread ("T") is the assigned utilization level of 2; and the actual utilization level for a high criticality level thread ("T'") is inflated to have an assigned utilization level of 6. Also, for the purpose of the example, consider the scenario in which low criticality level threads are coalesced onto processor group (7).

FIG. 5A shows an initial allocation of threads to processor groups. As shown in FIG. 5A, processor groups (39, 42, and 44) each execute a thread with a medium high criticality level. Processor group (47) executes a thread with a medium low criticality level. Further, processor groups (57, 59, 60, 61, 62, and 63) each execute a thread with a low criticality level.

Continuing with the example, consider the scenario in which the scheduler receives a request to schedule a new thread. In response to the request, the scheduler determines that based on the application making the request and the priority level set in the request that the thread is a low criticality level thread. Accordingly, the scheduler schedules the new thread based on the low criticality level thread.

Because the new thread is a low criticality level thread and the scheduler is configured to coalesce low criticality level threads, the scheduler traverses from processor group (1) to processor group (3) to processor group (7). Next, the scheduler compares the assigned utilization level of processor group (14) with the assigned utilization level of processor group (15). Because the assigned utilization level of processor group (14) is less than the assigned utilization level of processor group (15), the scheduler schedules the new thread in processor group (14). Further, because the assigned utilization level of processor group (28) is the same as assigned utilization level of processor group (29), the scheduler may select either processor group. For the purpose of the example, consider the scenario in which the scheduler selects processor group (29).

FIG. 5B shows the example processor group hierarchy after the new low criticality level thread is scheduled on processor group (58). As shown in FIG. 5B, because a low criticality level thread is scheduled, the assigned utilization level of processor groups (58, 29, 14, 7, 3, and 1) is all increased by 1.

Next, consider the scenario in which the scheduler receives a request to schedule a new thread. In response to the request, the scheduler determines that based on the application making the request and the priority level set in the request that the thread is a high criticality level thread.

Because the new thread is a high criticality level thread, and based on the current utilization of each of the processor groups, the scheduler traverses from processor group (1) to processor group (2) to processor group (4) to processor group (8) to processor group (17) to processor group (35).

FIG. 5C shows the example processor group hierarchy after the new high criticality level thread is scheduled on processor group (35). As shown in FIG. 5C, because a high criticality level thread is scheduled, the assigned utilization level of processor groups (17, 8, 4, 2, and 1) is all increased by 6. As shown in FIG. 5C, the scheduler inflates the assigned utilization level of the new thread to 6. Because of the inflated utilization level, some processor groups (e.g., 17 and 8) may have greater assigned utilization level than capacity. By inflating the utilization level of the high criticality level threads, the high criticality level threads are allocated additional resources from which to execute uninterrupted. Specifically, threads are scheduled on processor groups (9, 10, 11, 12, 13, 14, and 15) before a new thread is scheduled on processor group (8). Thus, the thread is given access to additional resource.

Figure 6:
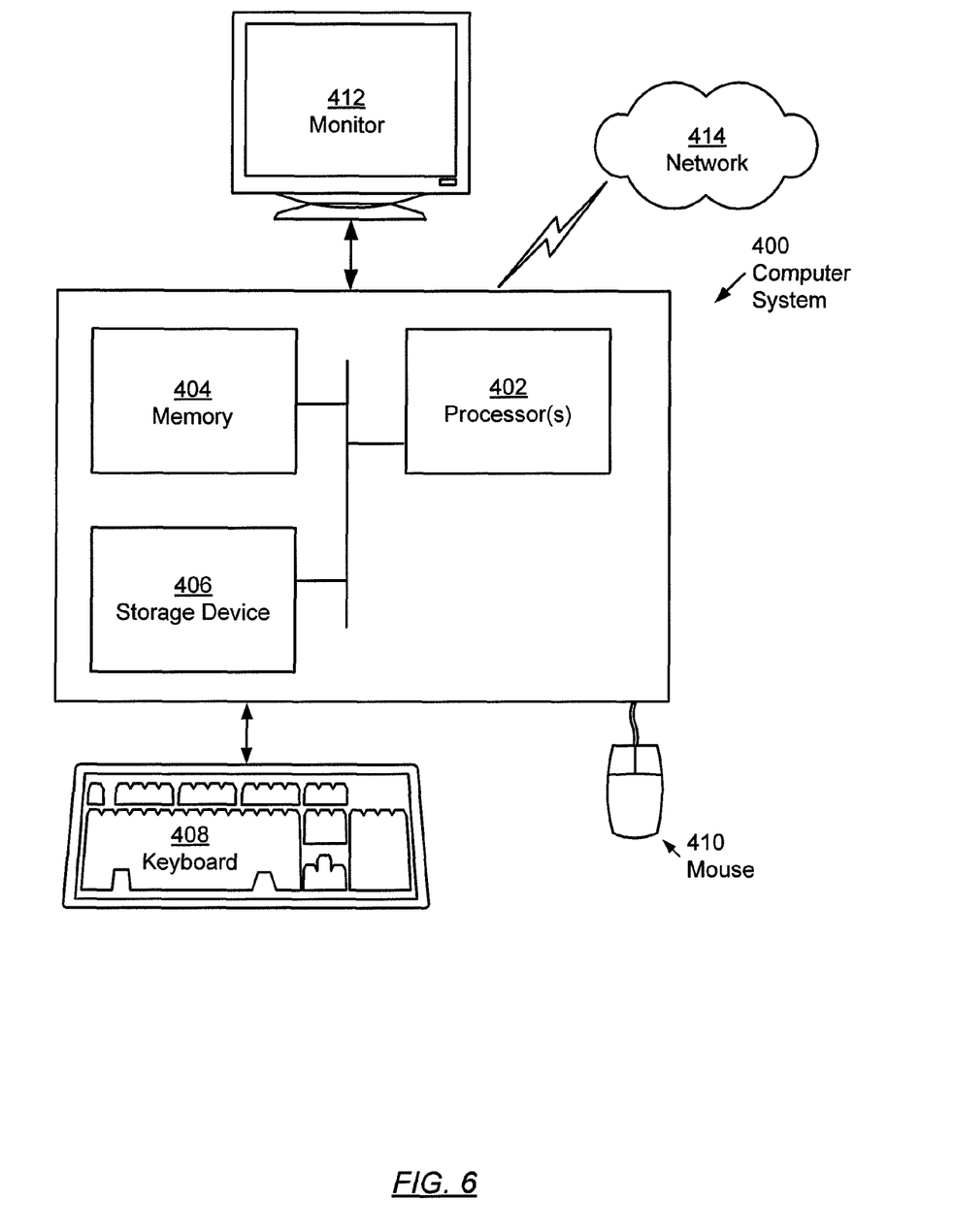
FIG. 6 shows a computer system in accordance with one or more embodiments of the invention.

Embodiments of the invention may be implemented on virtually any type of computer regardless of the platform being used. For example, as shown in FIG. 6, a computer system (400) includes one or more processor(s) (402), such as an integrated circuit, a central processing unit or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Many different types of computer systems exist, and the aforementioned input and output means may take other forms. Generally speaking, the computer system (400) includes at least the minimal processing, input, and/or output means necessary to practice embodiments of the invention.

Further, software instructions to perform embodiments of the invention may be stored, temporarily or permanently, in whole or in part, on a non-transitory computer readable storage medium such as a compact disc (CD), a diskette, a tape, physical memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scheduling a new thread, comprising:
   receiving a system call from an executing application for performing one selected from a group consisting of creating the new thread and modifying the new thread, wherein the system call comprises a priority value assigned by a developer of the executing application;
   detecting at least one dependent thread of the new thread;
   identifying a maximum criticality level from a criticality level of each of the at least one dependent thread;
   detecting a number of dependent threads of the new thread;
   assigning, by a hardware processor, a criticality level of the new thread based on the maximum criticality level, the priority value, and the number of dependent threads;
   selecting, by the hardware processor, a processor group from a plurality of processor groups according to the criticality level of the new thread and an existing assigned utilization level of the processor group to obtain a selected processor group;
   increasing an assigned utilization level of the selected processor group based on the new thread; and
   executing the new thread by the selected processor group.

2. The method of claim 1, wherein selecting the processor group comprises:
   traversing a processor group hierarchy comprising the plurality of processor groups by:
      for each current processor group in the processor group hierarchy:
         when the current processor group has at least one child processor group:
            calculating an availability value for each child processor group of the current processor group; and
            traversing to a child processor group having a highest availability value to obtain a new current processor group, wherein the child processor group is a child of the current processor group, and
         selecting the current processor group as the selected processor group when the processor group is a leaf processor group in the processor group hierarchy.

3. The method of claim 2, further comprising:
 determining that the criticality level of the new thread is less than a threshold criticality level,
 wherein, based on the criticality level of the new thread being less than the threshold criticality level, only a portion of the processor group hierarchy corresponding to low criticality level threads is traversed.

4. The method of claim 1, further comprising:
 determining that the criticality level of the new thread is at least a threshold criticality level; and
 rescheduling at least one existing thread executing on the selected processor group to another processor group of the plurality of processor groups based on the criticality level of the new thread being at least the threshold criticality level.

5. The method of claim 1, wherein increasing the assigned utilization level of the selected processor group comprises:
 determining that the criticality level of the new thread is at least a threshold criticality level; and
 increasing the assigned utilization level of the selected processor group by a maximum utilization level of the new thread based on the criticality level of the new thread being at least the threshold criticality level.

6. The method of claim 1, wherein increasing the assigned utilization level of the selected processor group comprises:
 determining that the criticality level of the new thread is less than a threshold criticality level; and
 increasing the assigned utilization level of the selected processor group by an average utilization level of the new thread based on the criticality level of the new thread being less than the threshold criticality level.

7. The method of claim 1, wherein the criticality level is defined based on whether the priority value exceeds a threshold priority value.

8. A system for scheduling a new thread, comprising:
 a plurality of hardware processing units logically grouped into a plurality of processor groups; and
 a scheduler module configured to:
  receive a system call from an executing application for performing one selected from a group consisting of creating the new thread and modifying the new thread, wherein the system call comprises a priority value assigned by a developer of the executing application;
  detect at least one dependent thread of the new thread;
  identify a maximum criticality level from a criticality level of each of the at least one dependent thread;
  detect a number of dependent threads of the new thread;
  assign a criticality level of the new thread based on the maximum criticality level, the priority value, and the number of dependent threads;
  select a processor group from the plurality of processor groups according to the criticality level of the new thread and an existing assigned utilization level of the processor group to obtain a selected processor group;
  increase an assigned utilization level of the selected processor group based on the new thread; and
  schedule the new thread to execute on the selected processor group.

9. The system of claim 8, further comprising:
 a processor group manager configured to:
  organize the plurality of processor groups into a processor group hierarchy comprising a plurality of levels, wherein each processor group of the plurality of processor groups comprises only hardware processing units that share a particular hardware resource, and wherein each level of the plurality of levels corresponds to a type of the particular hardware resource.

10. The system of claim 9, further comprising:
 a processor group data repository for storing the assigned utilization level and a capacity level for each of the plurality of processor groups.

11. The system of claim 9, wherein the scheduler module selects the processor group by traversing the processor group hierarchy.

12. The system of claim 11, wherein scheduler module is further configured to:
 determine that the criticality level of the new thread is less than a threshold criticality level,
 wherein, based on the criticality level of the new thread being less than the threshold criticality level, only a portion of the processor group hierarchy corresponding to low criticality level threads is traversed.

13. The system of claim 8, wherein increasing the assigned utilization level of the selected processor group comprises:
 determining that the criticality level of the new thread is at least a threshold criticality level; and
 increasing the assigned utilization level of the selected processor group by a maximum utilization level of the new thread based on the criticality level of the new thread being at least the threshold criticality level.

14. A non-transitory computer readable medium comprising computer readable program code embodied therein for causing a computer system to perform a method, the method comprising:
 receiving a system call from an executing application for performing one selected from a group consisting of creating the new thread and modifying the new thread, wherein the system call comprises a priority value assigned by a developer of the executing application;
 detecting at least one dependent thread of the new thread;
 identifying a maximum criticality level from a criticality level of each of the at least one dependent thread;
 detecting a number of dependent threads of the new thread;
 assigning a criticality level of the new thread based on the maximum criticality level, the priority value, and the number of dependent threads;
 selecting a processor group from a plurality of processor groups according to the criticality level of the new thread and an existing assigned utilization level of the processor group to obtain a selected processor group;
 increasing an assigned utilization level of the selected processor group based on the new thread; and
 executing the new thread by the selected processor group.

15. The non-transitory computer readable medium of claim 14, wherein selecting the processor group comprises:
 traversing a processor group hierarchy comprising the plurality of processor groups by:
  for each current processor group in the processor group hierarchy:
   when the current processor group has at least one child processor group:
    calculating an availability value for each child processor group of the current processor group; and
    traversing to a child processor group of the current processor group having a highest availability value to obtain a new current processor group,
   selecting the current processor group as the selected processor group when the processor group is a leaf processor group in the processor group hierarchy.

16. The non-transitory computer readable medium of claim 15, wherein the method further comprises:
 determining that the criticality level of the new thread is less than a threshold criticality level, wherein, based on the criticality level of the new thread being less than the threshold criticality level, only a portion of the processor group hierarchy corresponding to low criticality level threads is traversed.

17. The non-transitory computer readable medium of claim 14, wherein increasing the assigned utilization level of the selected processor group comprises:
   determining that the criticality level of the new thread is at least a threshold criticality level; and
   increasing the assigned utilization level of the selected processor group by a maximum utilization level of the new thread based on the criticality level of the new thread being at least the threshold criticality level.

18. The non-transitory computer readable medium of claim 14, wherein the method further comprises:
   determining that the criticality level of the new thread is at least a threshold criticality level; and
   rescheduling at least one existing thread executing on the selected processor group to another processor group of the plurality of processor groups based on the criticality level of the new thread being at least the threshold criticality level.

* * * * *